Nov. 12, 1963  J. PERROCHAT  3,110,068
MOLDING FASTENER
Filed April 14, 1961

Inventor:
Jean Perrochat,
by James B. Tiffany Jr. Atty.

United States Patent Office 3,110,068
Patented Nov. 12, 1963

3,110,068
MOLDING FASTENER
Jean Perrochat, Basel, Switzerland, assignor to A. Raymond, Lorrach, Baden, Germany, a firm
Filed Apr. 14, 1961, Ser. No. 102,984
1 Claim. (Cl. 24—73)

This invention relates generally to fastening devices and specifically to a water impervious molding fastener adapted to attach ornamental moldings to automobiles.

The invention constitutes an improvement over the device shown in a co-pending application, Serial No. 808,631, filed April 12, 1959, now Patent No. 3,063,114.

The invention comprises essentially a two part fastening device where one part is designed as a ring or hollow cylinder snapping into an opening of a mounting plate, while the other part is designed as a bolt engaging the object to be secured and having a shank snapping into the ring or hollow cylinder. Each of the component parts are formed with regard to each other of material of different hardness and elasticity with the softer more elastic part being held by the harder unelastic part in the fluid state under longitudinal stress. For example, the ring or hollow cylinder consists of a relatively soft elastic plastic material and one which I have used successfully is polyethylene and is provided in its central bore with an annular shoulder behind which the clamping bolt which consists of a hard unelastic material, snaps in with a reinforcement provided on its shaft.

The improvement which is the essence of the invention is in the form of the shoulder which has an annular bevelled face extending obliquely in the direction of the axis. Since the hardness and strength of a plastic diminishes considerably at high temperatures, and in order to be able to use the device according to the invention at higher than normal temperatures, a plastic must be used for the hollow cylinder which has a high melting point. A plastic with a high melting point has a low elasticity so that the clamping bolt can only be pressed with some difficulty into the hollow cylinder and can even damage the latter under some circumstances.

According to the invention, therefore, to eliminate the difficulties there presented, the object is to provide a plastic with a high melting point having an internal annular shoulder provided with bevel faces at the end of a truncated hollow cone extending from one end of the hollow cylinder in the direction of the axis. The shoulder is separated from the bevel face by an annular recess to allow an area for flexing.

Other objects of the invention will, in part, be obvious, and will, in part, appear hereinafter.

Figure 1:
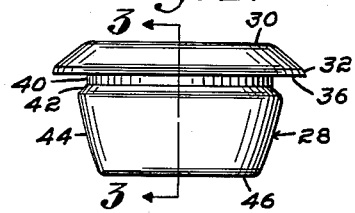
FIG. 1 is a view in side elevation of the hollow cylinder.
Figure 2:
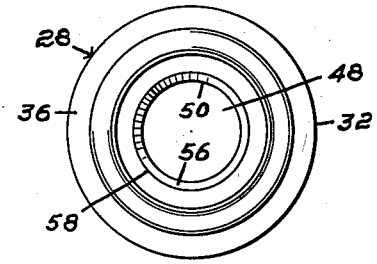
FIG. 2 is a bottom plan view of the hollow cylinder.
Figure 3:
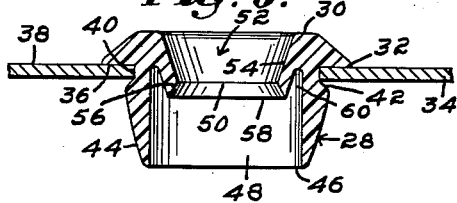
FIG. 3 is a view in section taken on the line 3—3 of FIG. 1 showing the hollow cylinder snapped into an apertured plate.

Referring to the drawings, there is illustrated a clamping bolt 10 of an appropriate plastic having a high degree of hardness but slight elasticity and has a head 12 adapted for snap engagement with a trim molding 14 or the like. The head 12 has an under surface 16 which forms a suitable offset with the head to correspond to the space between the inturned legs 18 and 20 of the molding 14.

Disposed adjacent the under surface 16 is a shaft portion 22 of reduced cross section and an outwardly extending shoulder 24 having diagonal surfaces 26 pointing to the head 12. The free end of the clamping bolt from the shoulder 24 on is formed as a rounded cone shaped point 27.

Figure 4:
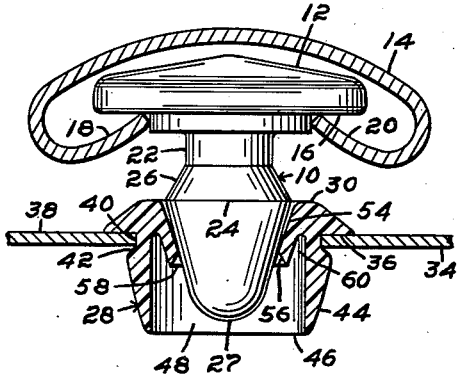
FIG. 4 is a view in elevation, partly in section, of a clamping bolt having a molding snapped thereon at one stage of insertion within the hollow cylinder.
Figure 5:
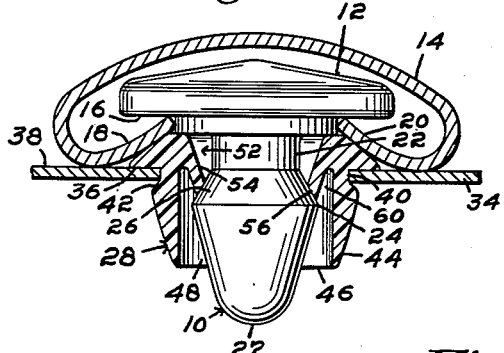
FIG. 5 is a view in side elevation, partly in section, of the completed assembly.

FIGS. 4 and 5 illustrate the details of the hollow cylinder 28 which is manufactured from a suitable soft plastic having a high degree of elasticity.

The upper end 30 of the hollow cylinder 28 is widened to a collar shaped projection 32 which is adapted after insertion into a supporting panel 34 to have the lower plane 36 resting on the upper surface 38 of the panel. Immediately next to the projection 32 there is provided in the outer casing of the hollow cylinder a peripheral slot 40 which corresponds approximately to the thickness of the panel 34 and the side which extends away from the projection is shaped like an oblique shoulder 42. The lower end of the hollow cylinder forms on the outside surface a conical surface 44 narrowing toward the end 46. In the bore 48 of the hollow cylinder a shoulder 50 is arranged at the end portion of a truncated hollow cone 52 starting from the upper end 30 and extending obliquely inward in the direction of the central axis. In the embodiment illustrated in FIGS. 1 through 5 the inner shell of the hollow cone forms one bevel face 54 while the bevel face 56 is formed by the free end 58 of the hollow cone 52. The latter being detached and separated from the body proper of the hollow cylinder by an annular recess 60 starting from the bevel face 56 and extending approximately into the plane of the peripheral slot 40.

Figure 6:
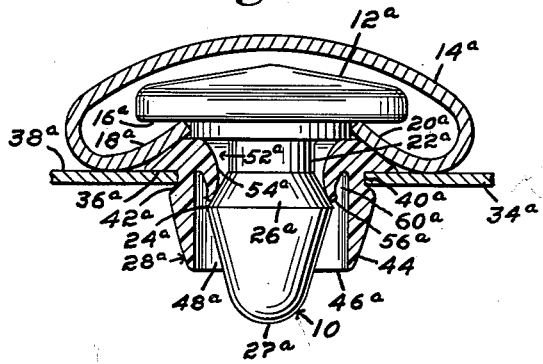
FIG. 6 is a view in side elevation, partly in section, of a modified form of the invention.

FIG. 6 illustrates a modified form of the invention where the truncated hollow cone 52 does not have a lower bevel face but the free end 58' is designed to flex away from the central axis due to frictional engagement with the surface of the rounded cone shaped part 26' of the clamping bolt 10'.

The arrangement of a construction utilizing either the peripheral or modified form of the invention is that the recess 60 provides an area to allow flexing of the legs of the truncated hollow cone 52 to permit passage of the clamping bolt and frictionally engage same to permit retention therein.

Sufficient adhesion is thereby accomplished and thus a reliable and watertight joint is effected between the bolt and the hollow cylinder.

Since certain other obvious modifications may be made in this device without departing from the scope of the invention, it is intended that all matter contained herein be interpreted in an illustrative and not in a limiting sense.

I claim:

A molding fastener assembly including a snap fastener attachment grommet and a solid attachment stud, said attachment stud having a head portion and a shaft extending from said head portion, said head portion having a diameter greater than said shaft, said shaft having an external circumferential shoulder, said shoulder having a diagonal surface directed toward the plane of said head portion, said fastener attachment grommet having a tubular body and having a first and second open end and an inner shell within the area of said tubular body integral with the wall of said first open end, said shell having the general configuration of a truncated cone and having a free flexible terminal end directed toward the axis of said attachment grommet, said terminal end of said shell formed to engage said diagonal surface of said shoulder when said stud is inserted in said grommet and the major portion of said shell spaced from said tubular body, said shell providing an independent yieldable engagement with said stud.

(References on following page)

References Cited in the file of this patent

UNITED STATES PATENTS

| | | |
|---|---|---|
| 2,178,055 | Stupell | Oct. 31, 1939 |
| 2,592,130 | Erh et al. | Apr. 8, 1952 |
| 2,610,879 | Pope | Sept. 16, 1952 |
| 2,786,359 | Karlon et al. | Mar. 26, 1957 |
| 2,800,526 | Moorhead | July 23, 1957 |
| 2,895,199 | Jones | July 21, 1959 |
| 2,937,834 | Orenick et al. | May 24, 1960 |

FOREIGN PATENTS

| | | |
|---|---|---|
| 621,404 | Great Britain | Apr. 8, 1949 |
| 788,742 | Great Britain | Jan. 8, 1958 |
| 1,222,697 | France | Jan. 25, 1960 |